(12) United States Patent
Sakai

(10) Patent No.: US 10,884,819 B2
(45) Date of Patent: Jan. 5, 2021

(54) INFORMATION PROCESSING APPARATUS AND METHOD FOR MONITORING AND ALLOCATING PROCESSOR LOADS

(71) Applicant: FUJITSU LIMITED, Kanagawa (JP)

(72) Inventor: Atsushi Sakai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 313 days.

(21) Appl. No.: 16/004,629

(22) Filed: Jun. 11, 2018

(65) Prior Publication Data

US 2018/0365078 A1 Dec. 20, 2018

(30) Foreign Application Priority Data

Jun. 16, 2017 (JP) .................. 2017-118782

(51) Int. Cl.
*G06F 9/46* (2006.01)
*G06F 9/50* (2006.01)
*G06F 9/455* (2018.01)

(52) U.S. Cl.
CPC ........ G06F 9/5083 (2013.01); G06F 9/45558 (2013.01); G06F 9/5016 (2013.01); G06F 9/5088 (2013.01); *G06F 2009/4557* (2013.01)

(58) Field of Classification Search
CPC .. G06F 9/5083; G06F 9/45558; G06F 9/5016; G06F 9/5088; G06F 2009/4557
See application file for complete search history.

(56) References Cited

U.S. PATENT DOCUMENTS

| 7,797,512 | B1* | 9/2010 | Cheng | G06F 9/455 712/10 |
|---|---|---|---|---|
| 2007/0220028 | A1 | 9/2007 | Hikawa et al. | |
| 2012/0159461 | A1 | 6/2012 | Nakaike | |
| 2013/0297888 | A1* | 11/2013 | Yamashita | G06F 9/4843 711/141 |
| 2014/0181834 | A1* | 6/2014 | Lim | G06F 9/5088 718/105 |
| 2016/0246655 | A1* | 8/2016 | Kimmel | G06F 12/0842 |

FOREIGN PATENT DOCUMENTS

| JP | 2005-339438 | 12/2005 |
|---|---|---|
| JP | 2007-249468 | 9/2007 |
| JP | 2012-128628 | 7/2012 |
| JP | 2016-537709 | 12/2016 |
| WO | 2015/055083 | 4/2015 |

* cited by examiner

*Primary Examiner* — Wissam Rashid
(74) *Attorney, Agent, or Firm* — Fujitsu Patent Center

(57) ABSTRACT

An information processing apparatus includes a memory and a processor coupled to the memory. The processor is configured to monitor each of loads of processor cores performing processes for which a parallel operation is inhibited. The processor cores are included in the information processing apparatus. The processor is configured to identify a first process that is being performed by a first processor core having a load that equals or exceeds a predetermined threshold value of a first load from among the processor cores based on a correspondence relationship between the processes and the first processor core.

7 Claims, 10 Drawing Sheets

TABLE 1

| GUEST ID | PROCESS ID | GUEST CPU CORE ID |
|---|---|---|
| 1 | 2 | 3 |
| 4 | 5 | 6 |

TABLE 2

| GUEST ID | GUEST PROCESS NAME |
|---|---|
| 1 | abc |
| 2 | def |

TABLE 3

| LOAD DETECTING THRESHOLD VALUE FOR CPU CORE |
|---|
| 70 |

TABLE 4

| GUEST PROCESS NAME OF MONITORING TARGET |
|---|
| abc |
| def |

TABLE 5

| LOAD DETECTING THRESHOLD VALUE FOR PROCESS ID GROUP |
|---|
| 60 |

TABLE 11

| PROCESS ID | CPU CORE ID |
|---|---|
| 1 | 2 |
| 3 | 4 |

TABLE 12

| PROCESS NAME |
|---|
| pqr |
| stu |

TABLE 13

| LOAD DETECTING THRESHOLD VALUE FOR CPU CORE |
|---|
| 70 |

TABLE 14

| PROCESS NAME OF MONITORING TARGET |
|---|
| pqr |
| stu |

TABLE 15

| LOAD DETECTING THRESHOLD VALUE FOR PROCESS ID GROUP |
|---|
| 50 |

INFORMATION PROCESSING APPARATUS AND METHOD FOR MONITORING AND ALLOCATING PROCESSOR LOADS

CROSS-REFERENCE TO RELATED APPLICATION

This application is based upon and claims the benefit of priority of the prior Japanese Patent Application No. 2017-118782, filed on Jun. 16, 2017, the entire contents of which are incorporated herein by reference.

FIELD

The embodiment discussed herein is related to an information processing apparatus, an information processing method, and a program.

BACKGROUND

In information processing apparatuses, including a server, an interpreter may be implemented in multiple threads (multi-thread) using multiple central processing unit (CPU) cores. When the multi-thread is performed, a memory region which each thread is able to access is not limited, and each thread may access the same address space. When an interpreter performs, in parallel, codes that are not thread-safe using multiple threads, the multiple threads access the same address space, and there is a possibility that an unexpected action may take place.

In order to address the above problem, a locking operation called global interpreter lock (GIL) may be used during the operation of the interpreter. GIL is an exclusive lock that causes a CPU core, which a thread having acquired a lock is allocated to, to perform an interpreter operation, and inhibits another CPU core, which a thread not having acquired a lock is allocated to, from performing an interpreter operation. The thread periodically acquires or releases the lock, causes the CPU cores to exchange the lock, and performs the interpreter operation. Also, a technique intended to optimize the execution of the interpreter operation and protect shared data using the lock is disclosed. (Japanese Laid-open Patent Publication Nos. 2016-537709, 2012-128628, 2005-339437, and 2007-249468 disclose the techniques described above.)

When an interpreter is implemented as an example of a program for which a parallel operation of multiple processes is inhibited, multiple CPU cores are used. In such a case, a single core may occupy the lock. For example, the threads allocated to the multiple threads may exchange the single lock to implement the interpreter. Upon acquiring the lock, the thread of a CPU core may acquire from a memory a shared flag indicating a locked state, and writes the flag onto a cache of the CPU core. The thread of the CPU core having acquired the lock updates the flag when the lock is released, and notifies other CPU cores that the lock is released.

The flag is present on the cache used by the CPU core having the thread with the lock thereof released, but no flag is present on the caches of the other CPU cores. For this reason, the thread of another CPU core acquires the flag from the memory and writes the flag on the cache in order to acquire the lock. During this process, the thread having released the lock may reference the flag on the cache of the CPU core, and may acquire the lock again. As a result, there is a possibility that the thread of a CPU core having a higher load repeats release and acquisition of the lock, and that the threads of the other CPU cores are unable to acquire the lock.

A technique is available to control the occupation of the lock by a single CPU core. In accordance with the technique, information concerning system time and user time of each CPU core is collected via a sampling operation on each CPU core, and a process imposing a higher load on a CPU core is identified. In the sampling operation, however, if processes increase as monitoring targets, process structures serving as check targets also increase. The load on each CPU core may possibly increase.

SUMMARY

According to an aspect of the present invention, provided is an information processing apparatus including a memory and a processor coupled to the memory. The processor is configured to monitor each of loads of processor cores performing processes for which a parallel operation is inhibited. The processor cores are included in the information processing apparatus. The processor is configured to identify a first process that is being performed by a first processor core having a load that equals or exceeds a predetermined threshold value of a first load from among the processor cores based on a correspondence relationship between the processes and the first processor core.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment of the disclosure is described below with reference to the drawings. The description is made for exemplary purposes only, and is not intended to limit the configuration of the embodiment.

Figure 1:
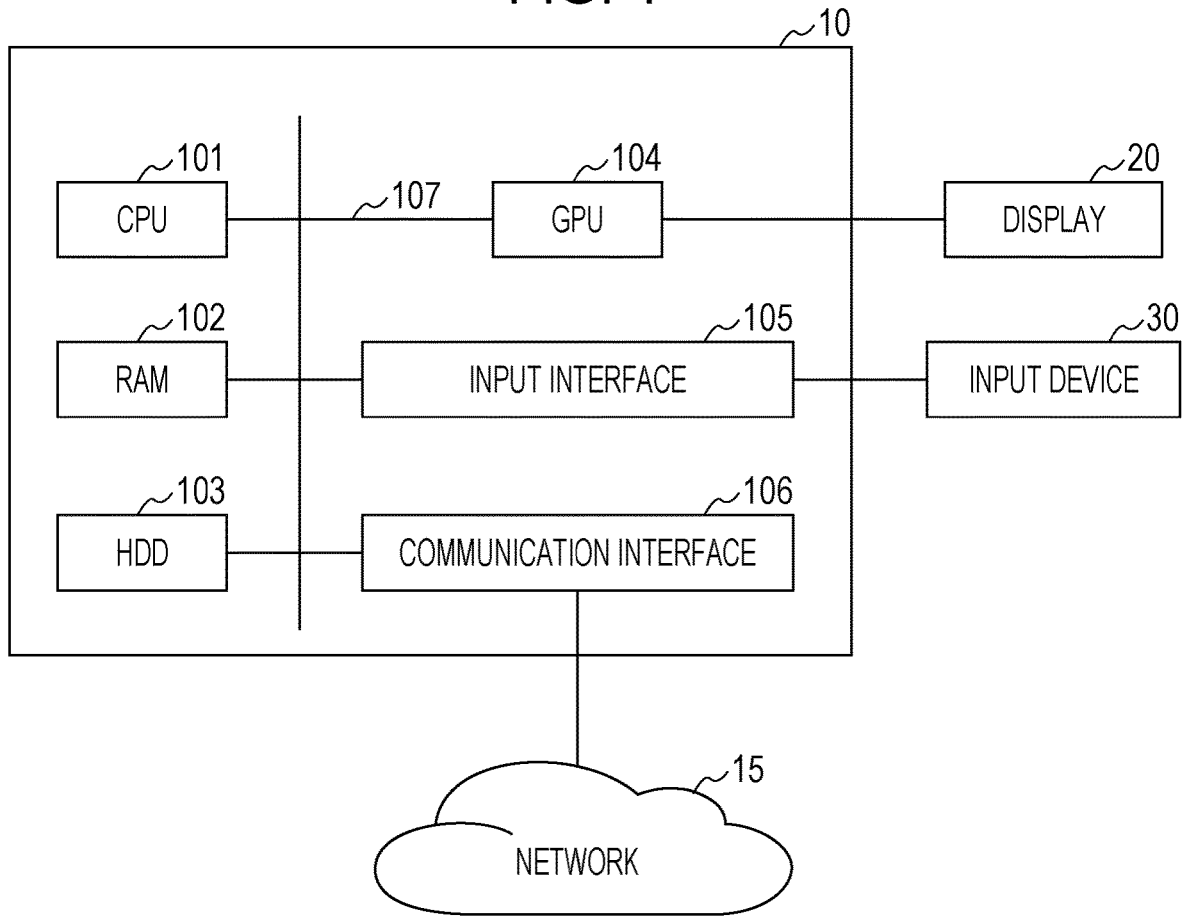
FIG. 1 illustrates a configuration example of a server of an embodiment.

FIG. 1 illustrates a configuration example of a server 10 of the embodiment. The server 10 is an example of an information processing apparatus. The server 10 includes a central processing unit (CPU) 101, a random access memory (RAM) 102, a hard disk drive (HDD) 103, a graphics processing unit (GPU) 104, an input interface 105, and a communication interface 106. The GPU 104, the input interface 105, and the communication interface 106 are connected to each of a display 20, an input device 30, and a network 15. The CPU 101, the RAM 102, the HDD 103, the GPU 104, the input interface 105, and the communication interface 106 are connected to each other via a bus 107.

The user of the server 10 gives a variety of instructions to the server 10 using the input device 30, and verifies process results of the server 10 on the display 20. In accordance with the embodiment, the CPU 101 performs a variety of processes described below by expanding a variety of programs stored on the HDD 103 onto the RAM 102 to execute the programs.

Figure 2:
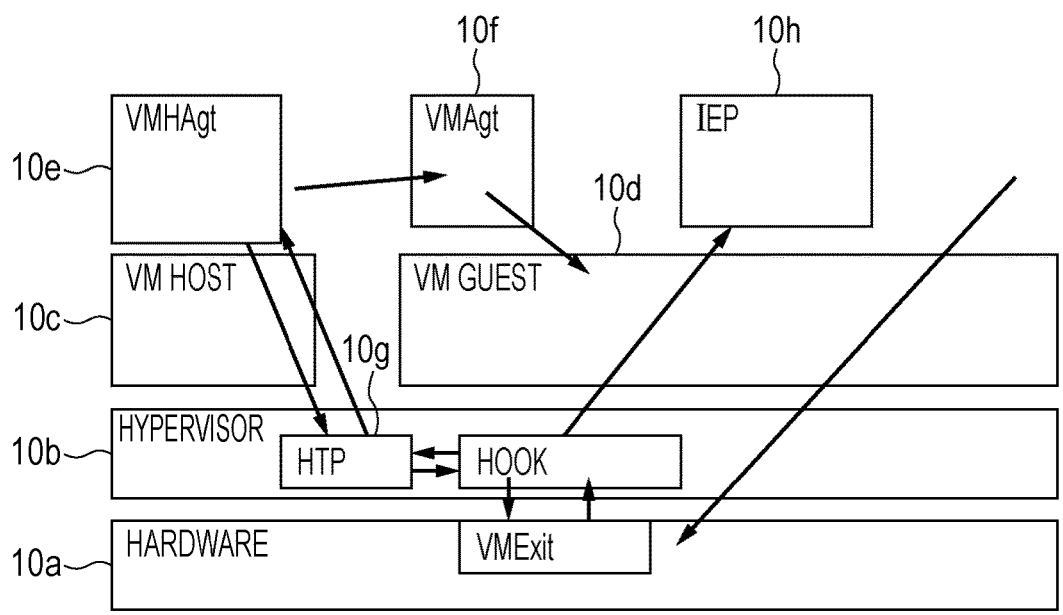
FIG. 2 illustrates an example of a virtual environment of the server of the embodiment.

FIG. 2 illustrates a configuration example of the server 10. In the server 10, a hypervisor 10b operates on hardware 10a. The hardware 10a may correspond to the CPU 101, the RAM 102, the HDD 103, the GPU 104, the input interface 105, and the communication interface 106 in the server 10. A virtual machine (VM) host 10c and a VM guest 10d are produced on the hypervisor 10b. The VM host 10c is virtualized server software that operates on the server 10 to cause a virtual machine to operate. The VM guest 10d is a virtual environment, such as a virtualized server provided by the VM host 10c.

A VM host agent ("VMHAgt" as illustrated in FIG. 2) 10e manages each of the VM host 10c, the hypervisor 10b, and a VM agent ("VMAgt") 10f on the VM guest 10d. A host trace program ("HTP") 10g monitoring each VM guest on the server 10 is executed on the hypervisor 10b. The VM guest 10d performs an interpreter execution program ("IEP") 10h. In response to an instruction from the user of the server 10, the host trace program 10g detects (hooks) a system call (a call from the hypervisor 10b). Control of the process of the execution program 10h that is being executed by the VM guest in response to the system call is transferred to the hypervisor 10b. This is called VMExit.

Figures 3, 4:
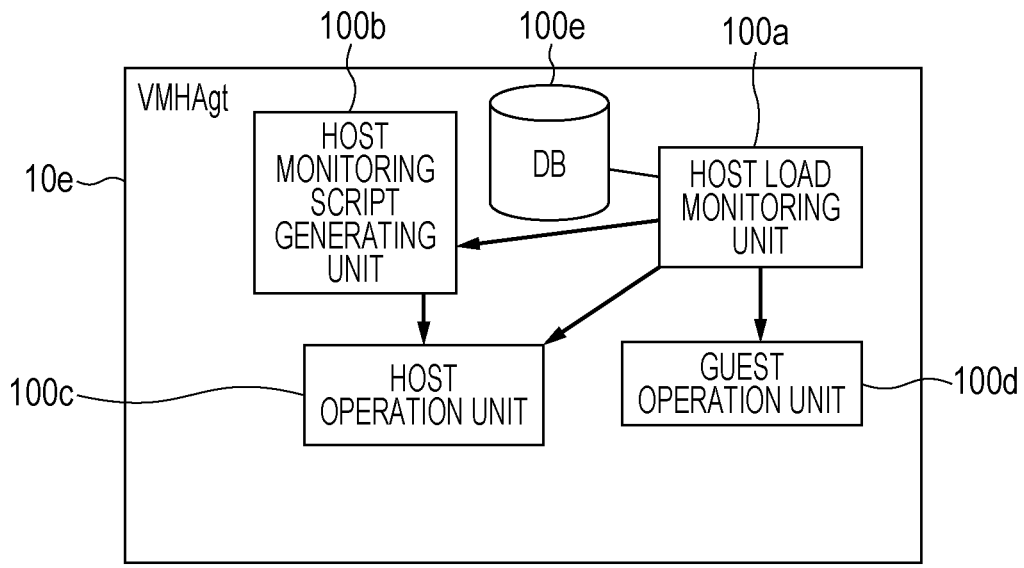
FIG. 3 illustrates a configuration example of a virtual machine (VM) host agent of the embodiment.
FIG. 4 illustrates an example of tables of the embodiment.

FIG. 3 illustrates a configuration example of the VM host agent 10e. The VM host agent 10e includes a host load monitoring unit 100a, a host monitoring script generating unit 100b, a host operation unit 100c, a guest operation unit 100d, and a database 100e. The host load monitoring unit 100a communicates with the host trace program 10g, thereby acquiring information concerning a load of the hypervisor 10b and the VM guest 10d. The host load monitoring unit 100a also performs a variety of determinations in accordance with the acquired information. For example, when the host load monitoring unit 100a detects that the host trace program 10g is not present on the hypervisor 10b at the startup of the server 10, the host load monitoring unit 100a causes the host operation unit 100c to perform an operation for executing the host trace program 10g on the hypervisor 10b. The host load monitoring unit 100a also receives from the host trace program 10g a notification related to the startup of a process on the VM guest 10d. Upon receiving the notification, the host load monitoring unit 100a instructs the guest operation unit 100d to configure a CPU core in response to the notified process.

In response to an instruction from the host load monitoring unit 100a, the host monitoring script generating unit 100b generates a program that is to be executed by the hypervisor 10b. The host monitoring script generating unit 100b also generates data, such as a file path for use in detecting a process to be executed on the VM guest 10d. In response to an instruction from the host load monitoring unit 100a, the host operation unit 100c transmits to the hypervisor 10b the program generated by the host monitoring script generating unit 100b. By communicating with the hypervisor 10b, the host operation unit 100c monitors the VM guest 10d via a tool or an interface implemented by the hypervisor 10b. In response to an instruction from the host load monitoring unit 100a, the guest operation unit 100d operates the VM guest 10d by communicating with the VM agent 10f.

Information concerning a process performed by the VM guest 10d and information concerning a virtual CPU core are stored on the database 100e. FIG. 4 illustrates an example of tables stored in the database 100e. Referring to FIG. 4, the database 100e stores a table ("table 1" as illustrated in FIG. 4) that lists a correspondence relationship between each virtual CPU core of the VM guest 10d and a process performed by the CPU core. More specifically, the table 1 stores an identifier allocated to a VM guest ("guest ID"). The table 1 also stores an identifier allocated to a process to be performed by the VM guest indicated by the guest ID ("process ID"). The table 1 further stores an identifier allocated to a virtual CPU core of the VM guest that performs the process indicated by the process ID ("guest CPU core ID").

The database 100e stores a table that lists information related to a process of the VM guest that serves as a monitoring target ("table 2" as illustrated FIG. 4). More specifically, the table 2 stores an identifier allocated to the VM guest ("VM guest"). The table 2 also stores the process name of a process that serves as a monitoring target from among the processes performed by the VM guest ("guest process name").

The database 100e stores a table ("table 3" as illustrated in FIG. 4) that lists a threshold value for use in determining the load of a physical CPU core of the server 10 ("load detecting threshold value for CPU core"). The database 100e also stores a table that lists a process name of a process that is a monitoring target ("table 4" as illustrated in FIG. 4). The database 100e also stores a table ("table 5" as illustrated in FIG. 4) that lists a threshold value ("load detecting threshold value for process ID group" as illustrated FIG. 4) that is used to determine the load of a process in a process ID group used in a virtual CPU core of the VM guest. Referring to FIG. 4, the information stored in each table has been described for exemplary purposes only, and different information may be stored in each column.

Figure 5:
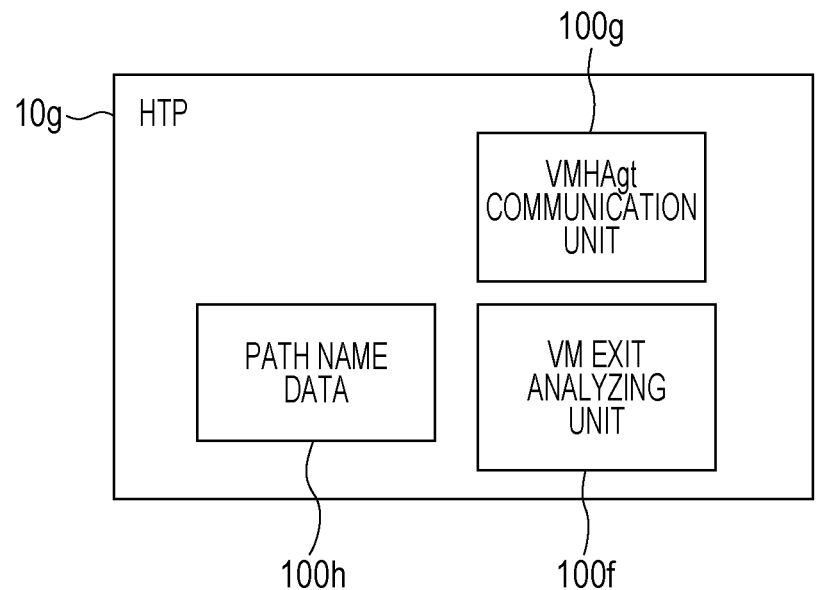
FIG. 5 illustrates a configuration example of a host trace program of the embodiment.

FIG. 5 illustrates a configuration example of the host trace program (HTP) 10g. The host trace program 10g includes a VM exit analyzing unit 100f, a VM host agent communication unit 100g, and path name data 100h. In accordance with the embodiment, the VM guest 10d receives a startup instruction of a process on the VM guest 10d from a user interface or a user program. In this case, a guest operating system (OS) of the VM guest 10d issues a system call that specifies a program of a process to be started up (a call for the hypervisor). Control is transferred from the VM guest 10*d* to the hypervisor 10*b* to acquire a process image of the process to be started up. An operation for state transition referred to as VM Exit is generated by the hardware. The VM exit analyzing unit 100*f* acquires information concerning the generated VM Exit, analyzes the cause of the control transfer, and identifies the program to be executed.

A path name of an execution program of a process related to the interpreter, from among the processes to be executed by the VM guest 10*d*, is stored on the path name data 100*h*. If the program identified in the analysis corresponds to the path name of the program stored on the path name data 100*h*, the VM exit analyzing unit 100*f* identifies the program as a monitoring target. The VM exit analyzing unit 100*f* notifies the VM host agent 10*e* of the program identified to be the monitoring target via the VM host agent communication unit 100*g*. Using the path name of the program stored on the path name data 100*h* in accordance with the embodiment, the VM exit analyzing unit 100*f* may determine whether the program that is to be executed in response to the detected system call is the interpreter.

Figure 6:
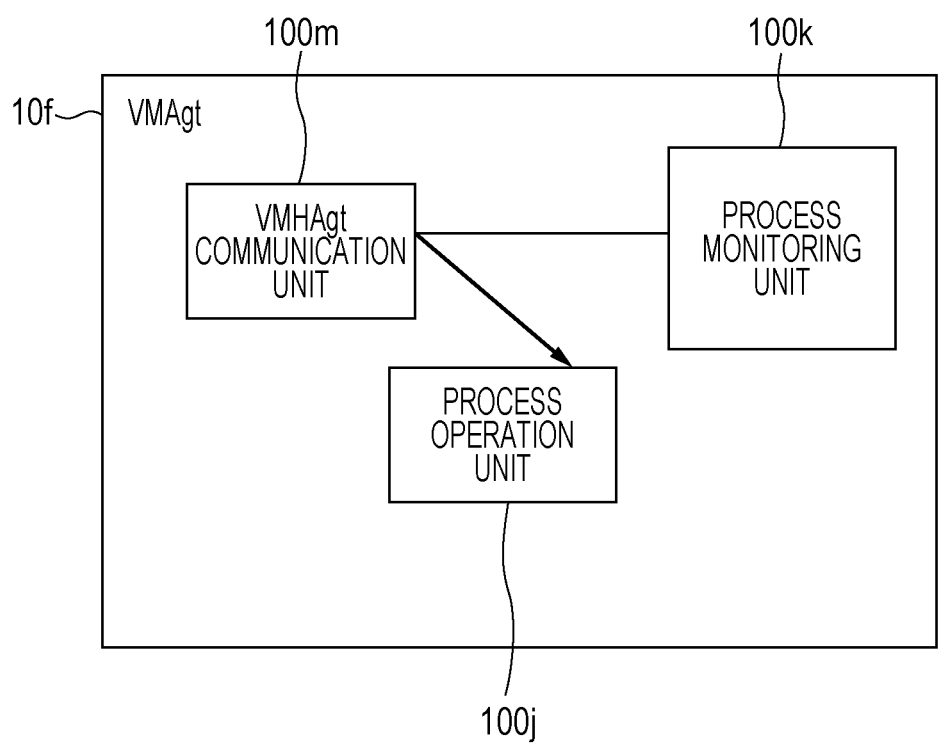
FIG. 6 illustrates a configuration example of the VM agent of the embodiment.

FIG. 6 illustrates a configuration example of the VM agent 10*f*. Referring to FIG. 6, the VM agent 10*f* includes a process operation unit 100*j*, a process monitoring unit 100*k*, and a VM host agent communication unit 100*m*. The process operation unit 100*j* determines the correspondence relationship between the process to be performed by the VM guest 10*d* and the virtual CPU core on the VM guest 10*d*. The process monitoring unit 100*k* monitors the correspondence relationship between the process to be performed by the VM guest 10*d* and the virtual CPU core on the VM guest 10*d*, and monitors the load on the virtual CPU core that performs a particular process. The VM host agent communication unit 100*m* communicates with the VM host agent 10*e*.

The process performed by the server 10 of the embodiment is described below with reference to FIG. 7 and FIG. 8. When the server 10 is powered on, the host trace program 10*g* starts the process of FIG. 7. In OP101, the host trace program 10*g* functioning as a detector detects a system call that has been issued by the guest OS of the VM guest 10*d*. Processing proceeds to OP102. In OP102, the host trace program 10*g* determines whether the detected system call is the one that is triggered by a process startup. If the system call is the one that is triggered by the process startup ("yes" branch from OP102), the host trace program 10*g* proceeds to OP103. If the system call is not the one triggered by the process startup ("no" branch from OP102), the host trace program 10*g* ends the process of the flowchart.

In OP103, the host trace program 10*g* identifies the path name of the program that is to be executed by the system call detected in the analysis performed by the VM exit analyzing unit 100*f*. Processing proceeds to OP104. In OP104, the host trace program 10*g* functioning as a determination unit determines whether the program is interpreter or not, based on a determination as to whether the path name of the program identified in the analysis performed by the VM exit analyzing unit 100*f* is stored on the path name data 100*h*. If the program is the interpreter ("yes" branch from OP104), the host trace program 10*g* proceeds to OP105. If the program is not the interpreter ("no" branch from OP104), the host trace program 10*g* ends the process of the flowchart.

In OP105, the host trace program 10*g* acquires the process ID of the program that has been determined to be the interpreter in OP104, from the analysis results of the VM exit analyzing unit 100*f*. In OP106, the host trace program 10*g* transmits, to the VM host agent 10*e*, the process ID acquired in OP105, the guest ID of the VM guest 10*d* acquired in the analysis results of the VM exit analyzing unit 100*f*, and the process name of the process corresponding to the process ID acquired in the analysis performed by the VM exit analyzing unit 100*f*.

Figure 8:
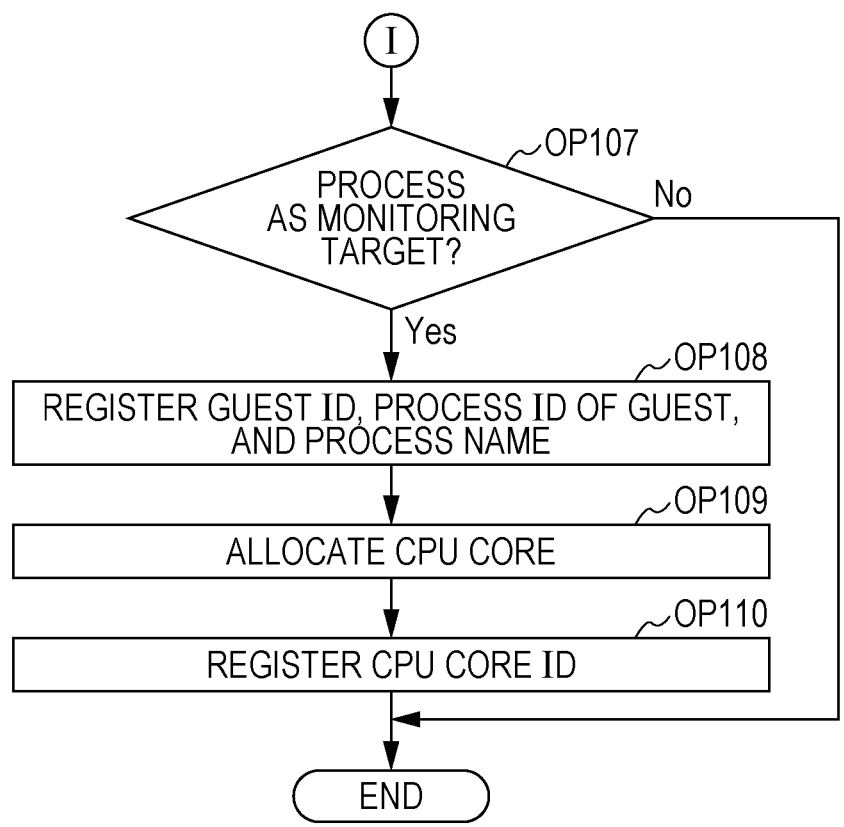
FIG. 8 is a flowchart illustrating a process performed by the server of the embodiment in succession to the process of FIG. 7.

Processing proceeds from OP106 to OP107 of FIG. 8. The entity performing the process of the flowchart is changed from the host trace program 10*g* to the VM host agent 10*e*. In OP107, the VM host agent 10*e* determines whether the process name received from the host trace program 10*g* is a process name stored as a monitoring target in the table 4 of the database 100*e*. If the process name received from the host trace program 10*g* is a monitoring target ("yes" branch from OP107), the VM host agent 10*e* proceeds to OP108. If the process name received from the host trace program 10*g* is not a monitoring target ("no" branch from OP107), the VM host agent 10*e* ends the process of the flowchart.

In OP108, the VM host agent 10*e* functioning as a memory registers in the table 1 of the database 100*e* the process ID acquired in OP105 and the guest ID of the VM guest 10*d* acquired in the analysis performed by the VM exit analyzing unit 100*f*. The VM host agent 10*e* registers in the table 2 of the database 100*e* the guest ID of the VM guest 10*d* acquired in the analysis performed by the VM exit analyzing unit 100*f* and the process name of the process corresponding to the process ID. Upon registering the guest ID, the process ID, and the process name in the respective tables of the database 100*e*, the VM host agent 10*e* proceeds to OP109.

In OP109, the VM host agent 10*e* instructs the VM agent 10*f* to allocate the CPU core of the VM guest 10*d* to the process registered in OP108. In response to the instruction from the VM host agent 10*e*, the VM agent 10*f* allocates the virtual CPU core to the process. Processing then proceeds to OP110. In OP110, the VM agent 10*f* notifies the VM host agent 10*e* of the CPU core ID of the virtual CPU core allocated to the process after the virtual CPU core is allocated. The VM host agent 10*e* registers in the table 1 of the database 100*e* the CPU core ID of the virtual CPU core of the VM guest 10*d* notified by the VM agent 10*f*. Upon registering the CPU core ID of the virtual CPU core, the VM host agent 10*e* ends the process of the flowchart.

Figure 7:
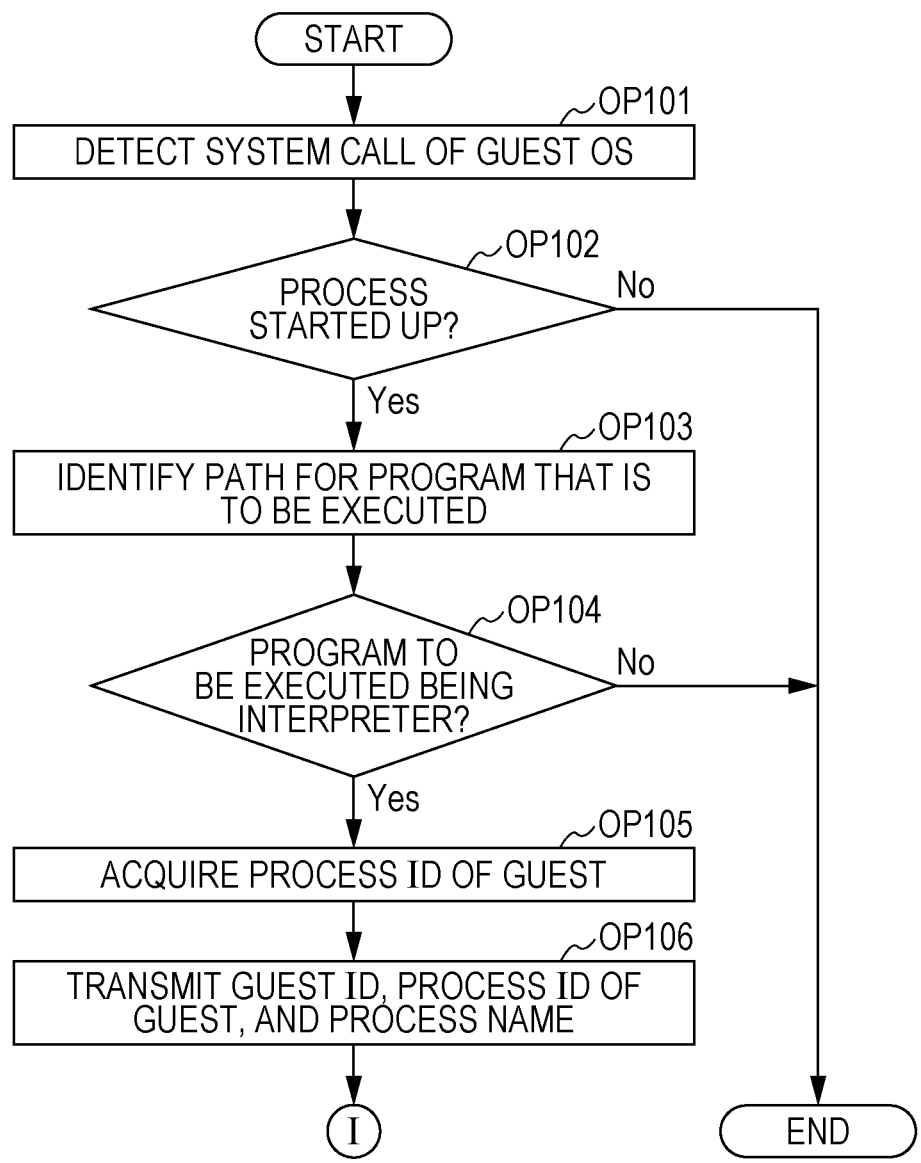
FIG. 7 is a flowchart illustrating a process performed by the server of the embodiment.
Figure 9:
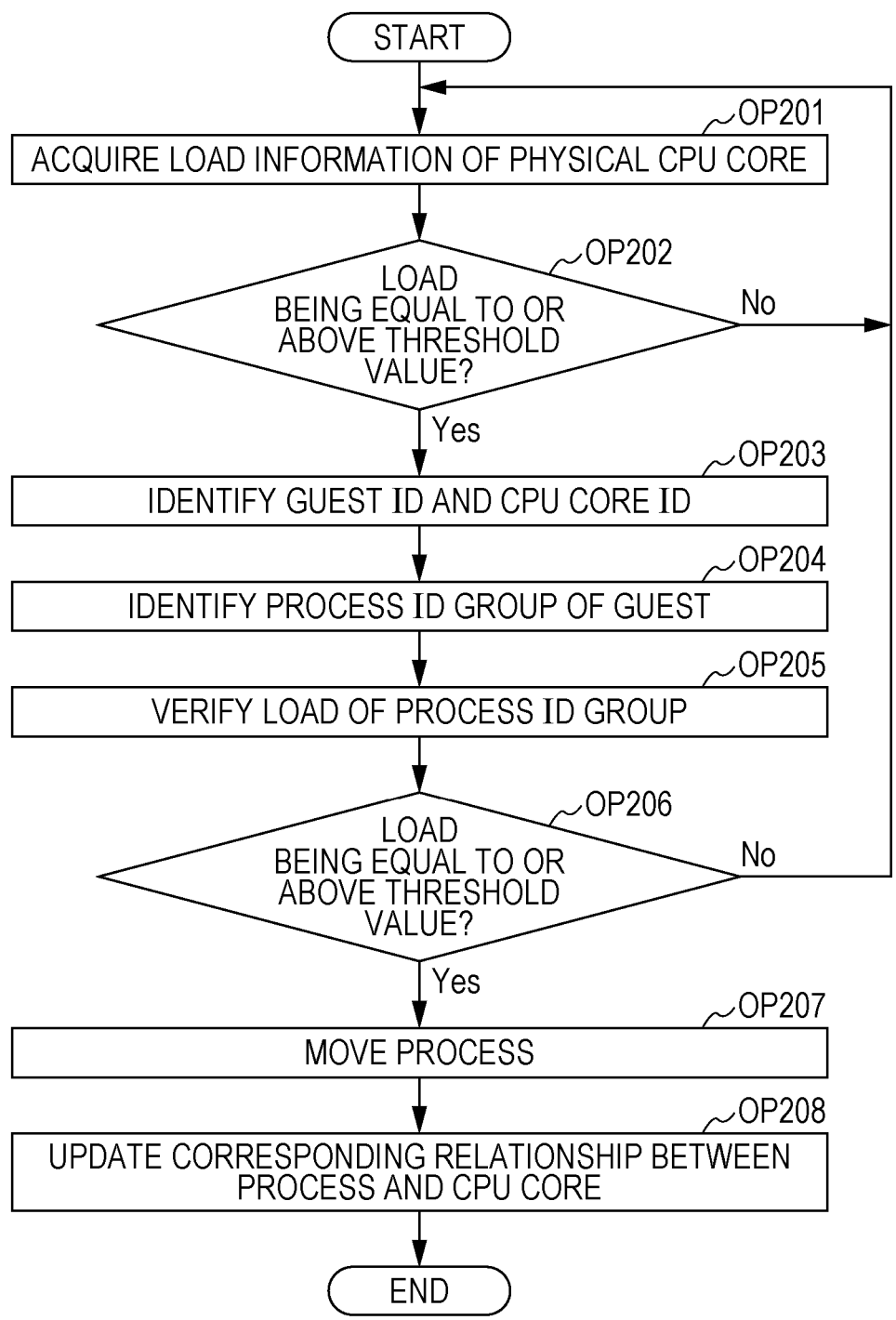
FIG. 9 is a flowchart illustrating a process that is performed by the server of the embodiment separately from the processes of FIG. 7 and FIG. 8.

FIG. 9 illustrates an example of a process performed by the server 10 subsequent to the allocation of the CPU core performed in the processes of the flowcharts of FIG. 7 and FIG. 8. For example, after the processes of FIG. 7 and FIG. 8 have been performed, the VM host agent 10*e* performs the process of FIG. 9 using information stored on the database 100*e*. In OP201, the VM host agent 10*e* acquires information concerning the load of each physical CPU core of the server 10. For example, the VM host agent 10*e* acquires a core usage rate of each physical CPU core of the server 10 as the information concerning the load on the physical CPU core, using a related art technique. The VM host agent 10*e* has acquired the information concerning the load of each physical CPU core, and then proceeds to OP202.

In OP202, the VM host agent 10*e* functioning as a monitoring unit determines, based on the information acquired in OP201, whether the load of each physical CPU core is equal to or above a threshold value. The threshold value is an example of a first load. The VM host agent 10*e* acquires the information concerning the threshold value from the table 3 of the database 100*e*. For example, the VM host agent 10*e* then determines whether the core usage rate of each physical CPU core is equal to or above the threshold value. If the core usage rate equal to or higher than the threshold value is present ("yes" branch from OP202), the VM host agent 10e proceeds to OP203. On the other hand, if the core usage rate of each physical CPU core is less than the threshold value ("no" branch from OP202), the VM host agent 10e returns to OP201.

In OP203, the VM host agent 10e acquires control information of the hypervisor 10b. The VM host agent 10e identifies the virtual CPU core that uses a physical CPU core with the load thereof determined to be equal to or above the threshold value, by referencing physical CPU core allocation information of the virtual CPU core contained in the control information of the hypervisor 10b. The VM host agent 10e identifies the guest ID corresponding to the VM guest having the identified virtual CPU core. The VM host agent 10e further identifies the CPU core ID corresponding to the identified virtual CPU core. The VM host agent 10e thus identifies the guest ID and the CPU core ID, and proceeds to OP204.

In OP204, the VM host agent 10e functioning as an identifying unit identifies the process ID of the process being performed by the virtual CPU core corresponding to the CPU core ID identified in OP203 by referencing the information stored in the table 1 of the database 100e. Since there are times when multiple process IDs are identified, the process IDs identified in OP204 are referred to as a process ID group. The VM host agent 10e, having identified the process ID group, proceeds to OP205.

In OP205, the VM host agent 10e instructs the VM agent 10f to verify the load on the virtual CPU core involved in executing the processes of the process ID group identified in OP204. The entity performing the process of the flowchart is changed from the VM host agent 10e to the VM agent 10f. In response to the instruction from the VM host agent 10e, the VM agent 10f acquires information concerning the load on the virtual CPU core involved in executing the processes of the process ID group identified in OP204. For example, the VM agent 10f acquires the core usage rate of the virtual CPU core as the information concerning the load on the virtual CPU core. In this way, the load on the processes of the process ID group with respect to the whole load of the virtual CPU core is thus recognized. The VM agent 10f having acquired the information concerning the load on the virtual CPU core proceeds to OP206.

In OP206, the VM agent 10f references the information acquired in OP205, and determines whether the load of the processes of the process ID group on the virtual CPU core is equal to or above a threshold value. The threshold value is an example of a second load. The VM agent 10f acquires the information of the threshold value from the table 5 of the database 100e. The VM agent 10f determines whether the core usage rate of the processes of the process ID core is equal to or above the threshold value. If the core usage rate of the processes of the process ID core is equal to or above the threshold value ("yes" branch from OP206), the VM agent 10f proceeds to OP207. If the core usage rate of the processes of the process ID core is less than the threshold value ("no" branch from OP206), the VM agent 10f returns to OP201.

In OP207, the VM agent 10f functioning as an allocating unit allocates the process corresponding to a single process ID of the process ID group identified in OP204 to the current virtual CPU core, namely, to the virtual CPU core identified in OP203. The VM agent 10f moves the process by allocating a process corresponding to a process ID remaining in the process ID group to another virtual CPU core in the VM guest. A related art technique, such as using a random number, may be used to determine how to determine the process with the allocation thereof remaining fixed to the current virtual CPU core and the process with the allocation thereof shifted to another virtual CPU core in the VM guest. The VM agent 10f having moved the process proceeds to OP208.

In OP208, the VM agent 10f functioning as an updating unit notifies the VM host agent 10e of the correspondence relationship between the process IDs of the process ID group and the CPU core ID of the virtual CPU core with the process allocated thereto. The entity of performing the process is changed from the VM agent 10f to the VM host agent 10e. The VM host agent 10e updates the correspondence relationship between the process ID stored in the table 1 of the database 100e and the CPU core ID, using the correspondence relationship between the process ID notified by the VM agent 10f and the CPU core ID. The VM host agent 10e ends the process of the flowchart of FIG. 9.

When control of the process to be performed by the virtual machine is transferred from the CPU core to the hypervisor via the operation in OP101, the information concerning the process may be acquired. Via the operations in OP102 through OP104, it is determined whether the process is related to the interpreter or not, namely, whether the process is a monitoring target. Via the operations in OP105 through OP110, the correspondence relationship between the process as the monitoring target and the virtual CPU core executing the process is acquired and stored as the information concerning the process as the monitoring target.

When the virtual machine is operated on the server 10 in the operations in OP201 and OP202, the state of the load on the virtual CPU core using the physical CPU core may be monitored in accordance with a determination of the load on the physical CPU core. In this way, the state of the load on the virtual CPU core may be monitored without re-configuring the VM guest, for example, without including in the VM guest a program that acquires the information concerning the load on the virtual CPU core.

Via the operations in OP203 through OP206, a determination as to whether the load is equal to or above a predetermined value is made by causing the virtual CPU core to perform the process as the monitoring target based on the information concerning the process acquired in advance as the monitoring target. In this way, identified is the virtual CPU core having a load that increases as the process as the monitoring target is performed. Via the operation in OP207, the load on the virtual CPU core is distributed by allocating the process to another virtual CPU core if the load on the virtual CPU core is equal to or above the predetermined value. As a result, when the virtual CPU core of a VM guest executes a program, such as an interpreter, including a code that is not thread safe, the lock occupation by the virtual CPU core is thus controlled, in other words, GIL in which the virtual CPU core inhibits another CPU core from executing the program is controlled. Via the operation in OP208, the correspondence relationship between the process subsequent to the process allocation and the processor core is recognized.

The embodiment has been described. The configuration and process of the server are not limited to those of the embodiment, and a variety of changes are possible to the embodiment without departing from the sprit and consistency of the disclosure. In the embodiment, the process as a monitoring target is performed by the interpreter. As long as a program for which a parallel operation of multiple processes is inhibited is used, the monitoring target is not limited to the interpreter.

A modification of the embodiment is described below. In one modification, elements identical to those of the embodiment are designated with the same reference numerals and the discussion thereof is omitted therein. In accordance with the embodiment, the process performed by the virtual CPU core of the VM guest is monitored. In the modification, a process performed by a physical CPU core is monitored. For this reason, the VM host, the VM guest, the VM Exit, and the VM agent are not used in the modification. The modification is based on the premise that the process is monitored when the OS 200*b* runs on the hardware 200*a* of the server 200.

Figures 10, 11:
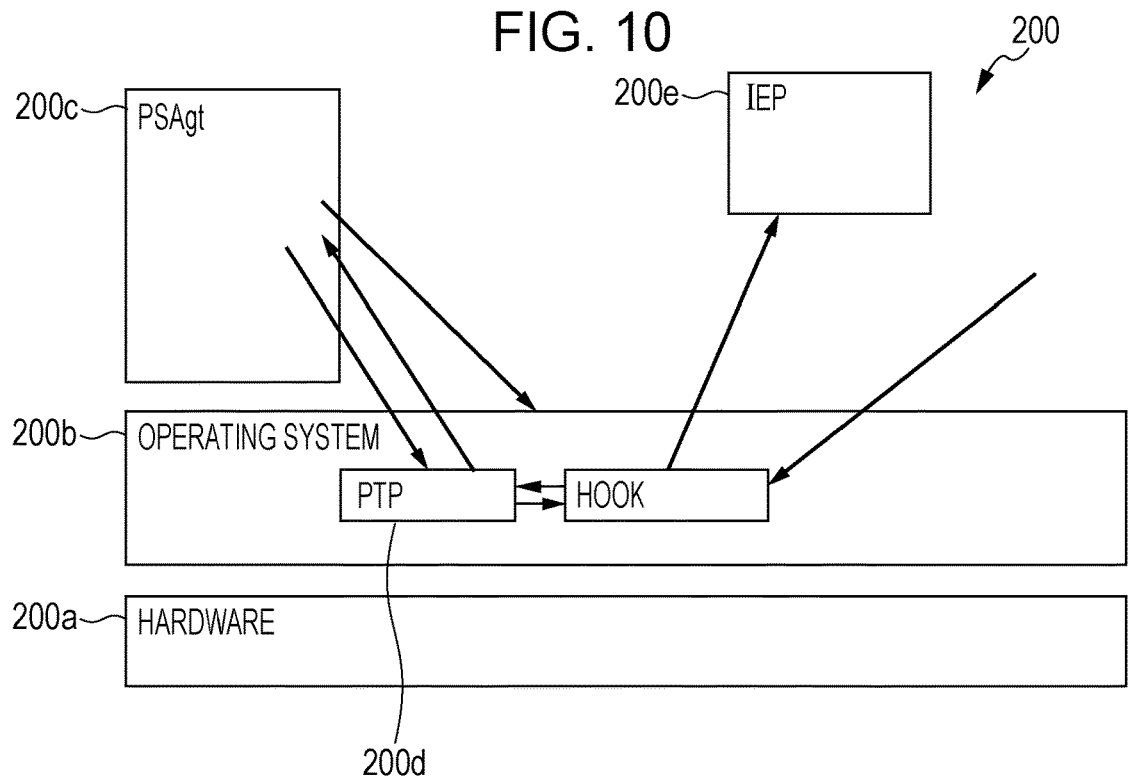
FIG. 10 illustrates an example of a physical environment of the server of a modification of the embodiment.
FIG. 11 illustrates an example of tables of the modification.

Referring to FIG. 10, the OS 200*b* includes a physical server trace program ("PTP" as illustrated in FIG. 10) 200*d*. Like the host trace program, the physical server trace program 200*d* is triggered by the system call in response to an instruction of the user of the server 200. A physical server agent ("PSAgt") 200C and an interpreter execution program ("IEP") 200*e* are executed on the OS 200*b*. The physical server agent 200*c*, the physical server trace program 200*d*, and the interpreter execution program 200*e* respectively correspond to the VM host agent 10*e*, the host trace program 10*g*, and the interpreter execution program 10*h*.

Referring to FIG. 11, the database 100*e* stores a table 11, a table 12, a table 13, a table 14, and a table 15. The table 11, the table 12, the table 13, the table 14, and the table 15 respectively correspond to the table 1, the table 2, the table 3, the table 4, and the table 5.

Figure 12:
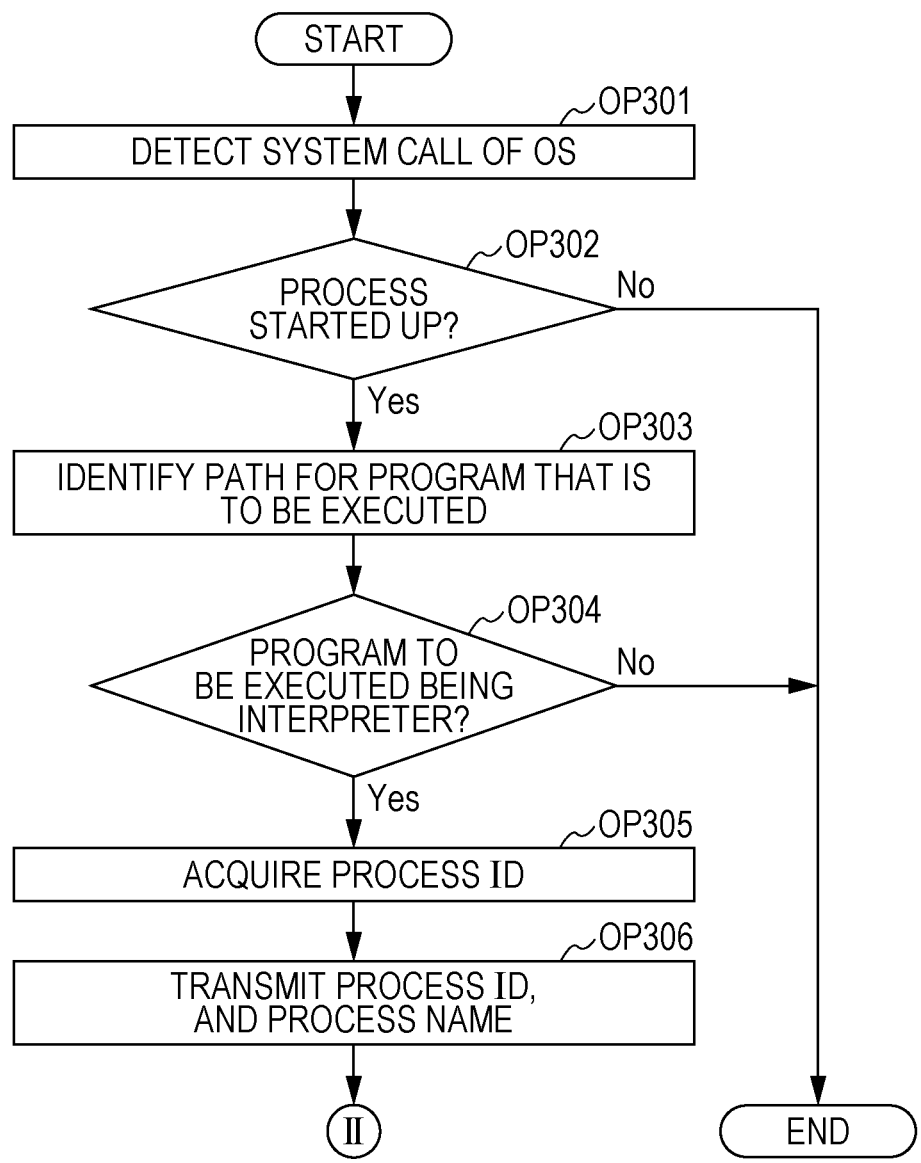
FIG. 12 is a flowchart illustrating a process performed by the server of the modification.
Figure 13:
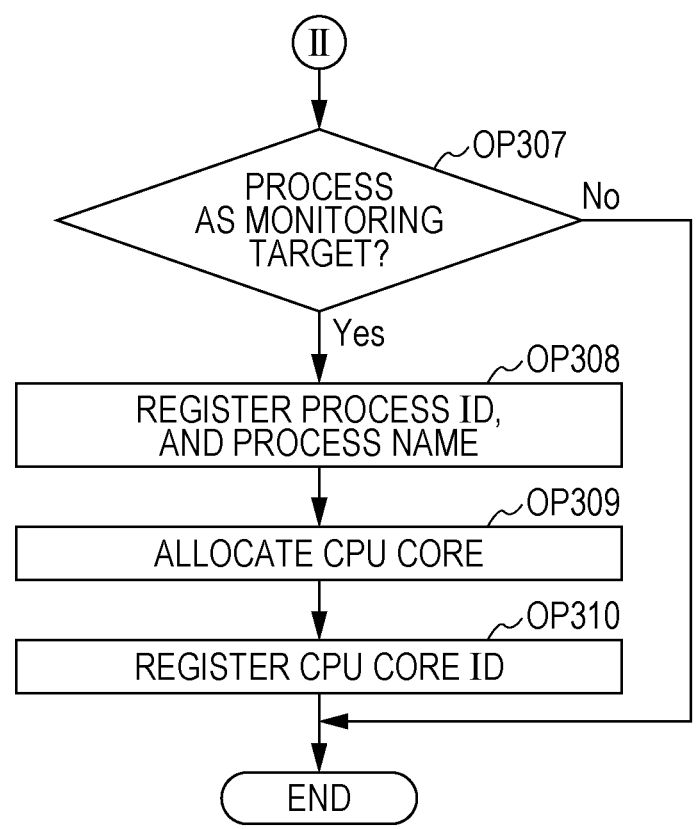
FIG. 13 is a flowchart illustrating a process performed by the server of the modification in succession to the process of FIG. 12.
Figure 14:
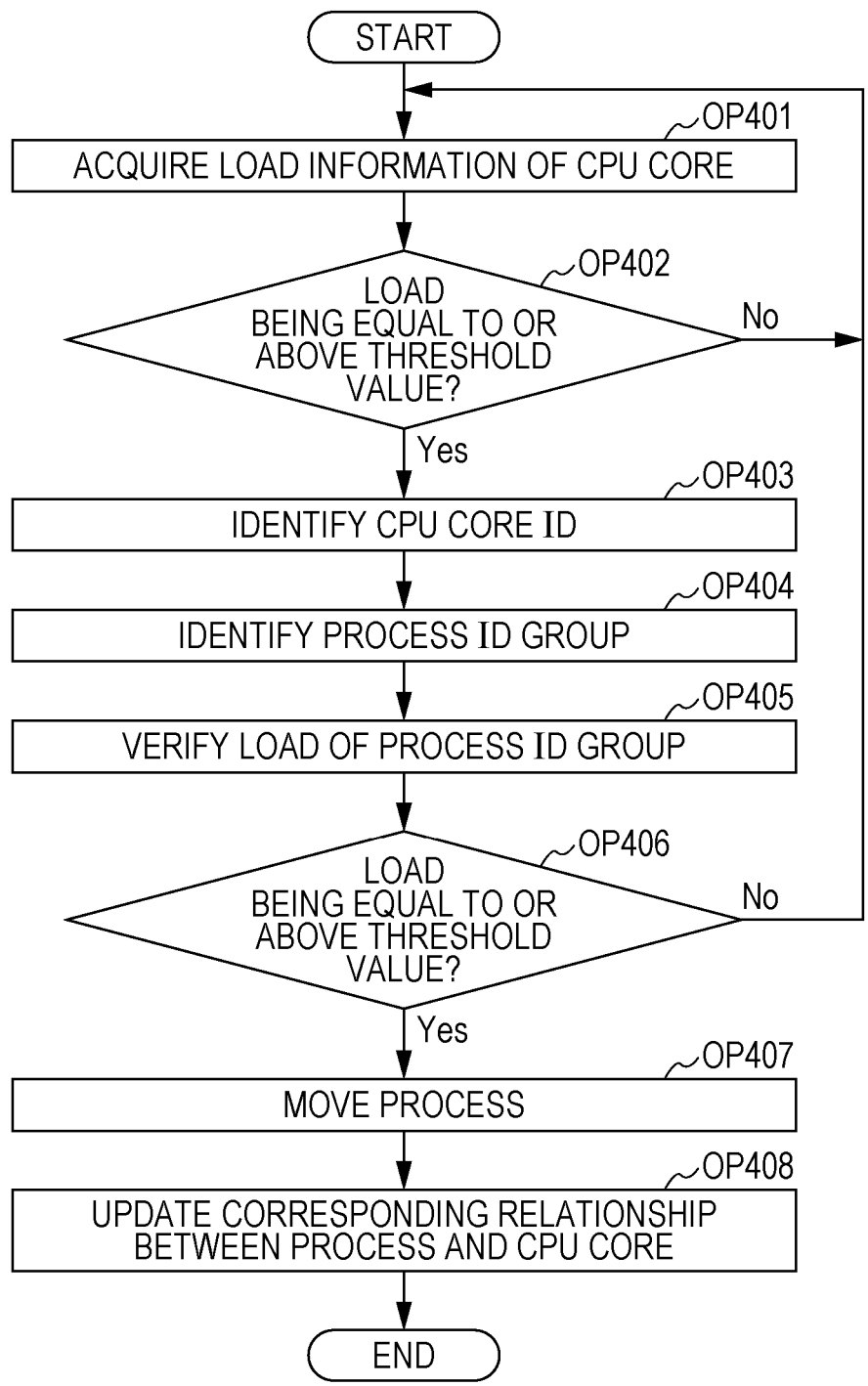
FIG. 14 is a flowchart illustrating a process performed by the server of the modification separately from the processes of FIG. 12 and FIG. 13.

FIG. 12 through FIG. 14 are flowcharts of processes performed by the server 200 of the modification. The operations in OP301 through OP310 respectively correspond to the operations in OP101 through OP110. In the modification, the system call of the OS 200*b* is detected instead of the system call of the guest OS. In the modification, the guest ID is not registered because the VM host and the VM guest are not present. In place of the process ID of the process performed by the VM guest, the process ID of the process performed by the physical CPU core is acquired, transmitted, and registered. Via the operations OP301 through OP310, the correspondence relationship between the process performed by the server 200 and the physical CPU core is identified.

Operations in OP401 through OP408 respectively correspond to the operations in OP201 through OP208. In accordance with the modification, the load of the process of the process ID group on the physical CPU core is verified in OP405 in place of the load of the process of the process ID group on the virtual CPU core. Via the operations in OP401 through OP408, identified is the physical CPU core having the load that increases as the server 200 performs the process as the monitoring target. Furthermore, the load on the physical CPU core is distributed by moving the process that causes the load on the physical CPU core to increase to another physical CPU core.

In accordance with the embodiment, at least some of the processes may be performed by one of processors other than the CPU. The processors other than the CPU may include dedicated processors, such as a digital signal processor (DSP), a graphics processing unit (GPU), a numerical data processor, a vector processor, or an image processing processor. At least some of the processes may be performed by an integrated circuit (IC), or another digital circuit. At least some of the processes may be performed by an analog circuit. The integrated circuits may include a large-scale integration (LSI), an application specific integrated circuit (ASIC), and a programmable logic device (PLD). For example, PLD includes a field-programmable gate array (FPGA). The elements may be a combination of a processor and an integrated circuit. Such a combination may be referred to as a micro-controller (MCU), a system-on-a-chip (SoC), a system LSI, or a chip set.

A program that implements a management tool to configure the server, and the OS may be recorded on a computer-readable recording medium on a computer or other devices (hereinafter representatively referred to as a computer). The functionalities of the server are thus implemented by causing the computer to read the program from the computer-readable recording medium and execute the program.

The computer-readable recording medium refers to a recording medium that allows the computer to store information, such as data and programs, thereon via an electrical, magnetic, optical, mechanical or chemical action, and then allows the computer to read the information therefrom via the electrical, magnetic, optical, mechanical or chemical action. Recording media that are removable from the computer includes a flexible disk, a magneto-optical disk, a compact disk read-only memory (CD-ROM), a compact disk read/write (CD-R/W), a digital versatile disk (DVD), a blu-ray disk, a digital audio tape (DAT), 8 mm tape, and a memory card, such as a flash memory. Recording media fixed onto the computer include a hard disk and a ROM.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus, comprising:
a memory stores relation information indicating correspondence relationships between processes and processor cores; and
a processor coupled to the memory, the processor configured to:
monitor each of loads of the processor cores performing the processes for which a parallel operation is inhibited, the processor cores being included in the information processing apparatus;
identify a first process that is being performed by a first processor core having a load that equals or exceeds a predetermined threshold value of a first load from among the processor cores based on a correspondence relationship between the processes and the first processor core;
determine, upon the first process being started up by the first processor core, whether the first process is a non-parallel process based on information indicative of a non-parallel process, the non-parallel process being a process for which a parallel operation is inhibited;
identify, upon determining that the first process is a non-parallel process, the first process based on the relation information stored in the memory;
determine whether the load of the first processor core equals or exceeds a predetermined threshold value of a second load; and
allocate, upon determining that the load of the first processor core equals or exceeds the predetermined threshold value of the second load, the first process to a second processor core of the processor cores, the second processor core being different from the first processor core; and update the relation information stored in the memory, based on a correspondence relationship between the first process and the second processor core.

2. The information processing apparatus according to claim 1, wherein the processor is further configured to:

determine that the first process is started up, upon detecting a system call related to the first process and issued by the information processing apparatus.

3. The information processing apparatus according to claim 1, wherein the processor cores performing a non-parallel process are virtual processor cores on virtual machines virtually formed by processes on physical processor cores included in the processor, and the processor is further configured to:

monitor loads of the virtual processor cores based on loads of the physical processor cores.

4. A non-transitory computer-readable recording medium having stored therein a program that causes a computer to execute a process, the process comprising:

monitoring each of loads of processor cores performing processes for which a parallel operation is inhibited, the processor cores being included in the computer; and identifying a first process that is being performed by a first processor core having a load that equals or exceeds a predetermined threshold value of a first load from among the processor cores based on a correspondence relationship between the processes and the first processor core determining, upon the first process being started up by the first processor core, whether the first process is a non-parallel process based on information indicative of a non-parallel process, the non-parallel process being a process for which a parallel operation is inhibited;

identifying, upon determining that the first process is a non-parallel process, the first process based on the relation information stored in the memory;

determining whether the load of the first processor core equals or exceeds a predetermined threshold value of a second load; and allocating, upon determining that the load of the first processor core equals or exceeds the predetermined threshold value of the second load, the first process to a second processor core of the processor cores, the second processor core being different from the first processor core; and updating the relation information stored in the memory, based on a correspondence relationship between the first process and the second processor core.

5. The non-transitory computer-readable recording medium according to claim 4, the process further comprising:

determining that the first process is started up, upon detecting a system call related to the first process and issued by the information processing apparatus.

6. The non-transitory computer-readable recording medium according to claim 4, wherein the processor cores performing a non-parallel process are virtual processor cores on virtual machines virtually formed by processes on physical processor cores included in the computer, the process further comprising:

monitoring loads of the virtual processor cores based on loads of the physical processor cores.

7. An information processing method, comprising:

acquiring, by a computer, load information of each of loads on respective physical CPU (Central Processing Unit) cores;

determining whether loads on the respective physical CPU cores are greater than or equal to a threshold value of a first load;

identifying a guest ID corresponding to a virtual machine guest having a respective virtual CPU core that uses a first physical CPU core determined to have a load greater than or equal to the threshold value of the first load;

identifying a process ID of a process being performed by the respective virtual CPU core;

verifying the load on the respective virtual CPU core performing the process having the process ID;

determining whether the load of the respective virtual CPU core performing the process having the process ID is greater than or equal to a second threshold value of a second load; and moving the process having the process ID from the respective virtual CPU core to another virtual CPU core when the load of the respective virtual CPU core performing the process is determined to be greater than or equal to the second threshold value of the second load.

* * * * *